US005396696A

United States Patent [19]

Kurogi et al.

[11] Patent Number: 5,396,696

[45] Date of Patent: Mar. 14, 1995

[54] FLYBACK TRANSFORMER DEVICE AND APPARATUS FOR PREPARING SAME

[75] Inventors: Akio Kurogi, Hirakata; Hiroshi Okamoto, Kyoto; Hideo Onishi, Nara; Yasushi Akado, Kyoto; Katsuya Tsubotani, Shijonawate, all of Japan

[73] Assignee: Sanyo Electric Co., Ltd., Moriguchi, Japan

[21] Appl. No.: 110,775

[22] Filed: Aug. 23, 1993

[30] Foreign Application Priority Data

Aug. 26, 1992 [JP] Japan .................................. 4-227142
Oct. 29, 1992 [JP] Japan .................................. 4-290601

[51] Int. Cl.$^{6}$ ............................................ B23Q 41/02

[52] U.S. Cl. .................................. 29/564.6; 29/602.1; 29/854; 336/192; 361/603; 361/809; 363/126

[58] Field of Search .............................. 363/53, 59–61, 363/65, 68, 125, 126, 144, 146; 174/94 R; 336/185, 192, 198, 208; 361/600, 602, 603, 679, 807, 809, 810; 29/602.1, 605, 729, 739, 741, 854, 564.6

[56] References Cited

U.S. PATENT DOCUMENTS

| | | | |
|---|---|---|---|
| 4,039,924 | 8/1977 | Scales | 363/65 |
| 4,271,463 | 6/1981 | Tanimura | 363/126 |
| 4,274,136 | 6/1981 | Onodera | 336/185 |
| 4,495,480 | 1/1985 | Martin | 335/199 |
| 4,658,492 | 4/1987 | Kieffer | 29/564.6 |
| 4,755,784 | 7/1988 | Taoka | 336/96 |
| 4,891,879 | 1/1990 | De Lange | 29/739 |
| 4,967,175 | 10/1990 | Berg | 336/65 |
| 5,307,555 | 5/1994 | Eder | 29/564.6 |

FOREIGN PATENT DOCUMENTS

| | | |
|---|---|---|
| 0201335 | 11/1986 | European Pat. Off. . |
| 58-132915 | 8/1983 | Japan . |
| 60-028773 | 2/1985 | Japan . |
| 61-179513 | 8/1986 | Japan . |
| 63-15668 | 1/1988 | Japan . |
| 1-105383 | 7/1989 | Japan . |
| 1-190267 | 7/1989 | Japan . |
| 2-11771 | 4/1990 | Japan . |

*Primary Examiner*—Gerald P. Tolin
*Attorney, Agent, or Firm*—Armstrong, Westerman, Hattori, McLeland & Naughton

[57] ABSTRACT

In a flyback transformer device wherein the leads of diodes or like electronic components are connected between pairs of terminal pieces provided upright at opposite ends of a coil bobbin, the lead ends of the components are fixedly connected to the respective terminal pieces by electric welding. A coil conductor wound around the bobbin has an end twined around the terminal piece, and the twined portion is soldered by dipping.

1 Claim, 20 Drawing Sheets

FLYBACK TRANSFORMER DEVICE AND APPARATUS FOR PREPARING SAME

FIELD OF THE INVENTION

The present invention relates to a flyback transformer device for use in television receivers and various display devices, and more particularly to the structure of a flyback transformer device wherein leads of electronic components are fixedly connected by electric welding to terminal pieces provided upright on a coil bobbin and a process for preparing the device.

BACKGROUND OF THE INVENTION

Flyback transformer devices 70 having coils provided in layers generally comprise, as shown in FIG. 23, a plurality of divided coils 74 wound around a coil bobbin 71, and pairs of terminal pieces 73 provided upright at opposite ends of the bobbin 71. A diode, resistor or like electronic component 6 is connected between each pair of opposed terminal pieces 73, 73.

Each of leads 63, 63 extending from opposite sides of the electronic component 6 is electrically fixedly connected to the terminal piece 73 conventionally by shaping the terminal piece 73 in a Y-form as illustrated, placing the outer end of the lead 63 on the Y-shaped portion of the terminal piece 73, crimping the Y-shaped portion to fix the lead 63 in this state and thereafter soldering the crimped portion by dipping (see, for example, Unexamined Japanese Utility Model Publication HEI 1-105383).

Another method of mounting electronic components on a coil bobbin has been proposed as shown in FIG. 24. A lead 63 is connected to a terminal piece 73*a* with a solder 66 as shown in FIG. 25 by bending the outer end 63*a* of the lead 63 to an L-shape, fitting the lead end 63*a* in a cavity 65 in a post 71*a* of the coil bobbin at one side of the terminal piece 73*a* to preliminarily fix the lead 63 as held in contact with the terminal piece 73*a* and thereafter dipping the fixed portion in solder (Unexamined Japanese Patent Publication SHO 63-15668 and Examined Japanese Utility Model Publication hei 2-1171).

However, the conventional method of mounting electronic components with use of Y-shaped terminal pieces requires the work of fixing the lead by crimping the terminal piece and therefore has the problem of being complex and necessitating cumbersome work.

On the other hand, the method wherein cavities are formed in the coil bobbin not only requires a device for bending leads and a device for inserting the lead into the cavity but also makes the die for producing bobbins complex in configuration to result in an increased cost. Another problem is also encountered in that the coil bobbin becomes larger.

Further when solder dipping is resorted to for connection, the solder dipping device requires labor for maintenance. This leads to an increase in manufacturing cost.

SUMMARY OF THE INVENTION

An object of the present invention is to provide the structure of a flyback transformer device wherein the leads of electronic components are fixedly connected to terminal pieces of a coil bobbin by electric welding although this has not been practiced, and a process for preparing the device so as to overcome all the problems described above.

The leads of electronic components can be connected to the terminal pieces of the coil bobbin by electric welding firmly with great ease. This simplifies the production process and leads to an automated connecting procedure.

Another object of the invention is to provide a process for preparing a flyback transformer device which includes the steps of producing a coil bobbin having upright terminal pieces, winding a coil conductor around the coil bobbin, twining an end portion of the wound coil conductor around one of the terminal pieces, fixing a lead of an electronic component to another one of the terminal pieces by spot welding, and soldering the twined portion of the coil conductor around the terminal piece by dipping.

After the coil conductor end portion has been preliminarily fixed to the terminal piece by the conductor twining step of the process, the solder dipping step ensures a mechanical and electrical connection between the coil conductor and the terminal piece.

Another object of the invention is to provide an apparatus for preparing flyback transformer devices which apparatus comprises an electronic component feeder, a lead cutter, a bobbin feed position determining mechanism, an electronic component transfer mechanism and an electric welder. The electronic component feeder feeds a component supply tape having a plurality of electronic components arranged at a specified pitch by paying off the tape longitudinally thereof by the specified pitch to send the components one after another to a lead cutting position. The lead cutter cuts off the electronic component in the lead cutting position at outer ends of leads to separate the component from the supply tape. The bobbin feed position determining mechanism feeds a coil bobbin toward a predetermined welding position to position a terminal piece of the coil bobbin in the welding position.

The electronic component transfer mechanism transfers the electronic component as cut off from the supply tape by the cutter toward the welding position and positions the lead of the component alongside the terminal piece of the bobbin in the welding position. The electric welder comprises a welding head movable toward or away from the welding position, and a pair of electrode pieces projecting from the welding head for holding therebetween the terminal piece of the coil bobbin and the lead of the component in the welding position.

With the apparatus described, the electronic component feeder, lead cutter, bobbin feed position determining mechanism, electronic component transfer mechanism and electric welder are related to one another and operate concurrently to produce the flyback transfer device within a short cycle time.

More specifically, the component supply tape is paid off by the feeder at the specified pitch in the longitudinal direction to feed electronic components one after another to the lead cutting position. When one electronic component is set in the lead cutting position, the lead cutter operates at the same time to cut off the component at the outer ends of leads and separate the component from the supply tape. The electronic component separated from the supply tape is transported by the component transfer mechanism from the lead cutting position toward the predetermined welding position. At this time, the coil bobbin is set in the predetermined welding position by the bobbin feed position determining mechanism.

Accordingly, when the component is set in the welding position by the transfer mechanism, the component has its lead positioned on the terminal piece of the coil bobbin in the welding position while being held by the transfer mechanism.

In this state, the electric welder operates, the welding head moves toward the welding position, and the pair of electrode pieces are positioned at opposite sides of the terminal piece and the lead. The terminal piece and the lead are thereafter held from opposite sides between the pair of electrode pieces. Simultaneously with this, current is passed across the electrode pieces, whereby the lead is joined to the terminal piece by spot welding.

With the production apparatus described, the welder operates with the component lead positioned alongside the bobbin terminal piece by the transfer mechanism to electrically weld the lead to the terminal piece. This eliminates the need to preliminarily fix the lead to the terminal piece. Accordingly, the terminal piece can be shaped merely in the form of a rod, and there is no need to form lead inserting cavities in the bobbin which are conventionally necessary, nor is it necessary to bend the leads of electronic components. As a result, it is possible to compact the flyback transformer device and to reduce the manufacturing cost of the device.

Moreover, the step of electrically welding the lead to the terminal piece is executed almost simultaneously with the step of positioning the lead alongside the bobbin terminal piece by causing the component transfer mechanism to hold the component. This results in a shorter cycle time than the conventional method wherein the lead is preliminarily fixed to the terminal piece and thereafter soldered thereto.

DETAILED DESCRIPTION OF EMBODIMENTS

Embodiments of the present invention will be described in detail with reference to the drawings.

Construction of Flyback Transformer Device

Figure 1A:
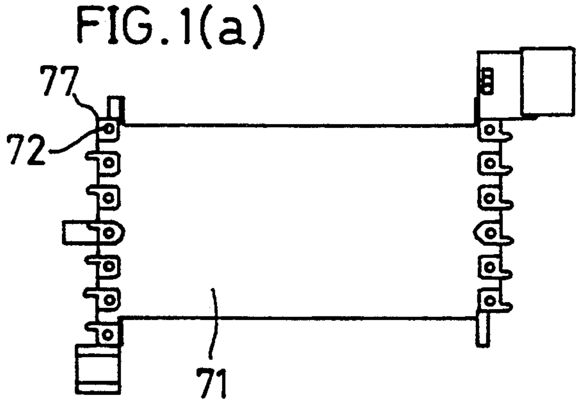
FIGS. 1 (*a*), (*b*) and (*c*) are a plan view, side elevation and front view, respectively, showing a coil bobbin in a flyback transformer device of the invention.
Figure 1B:
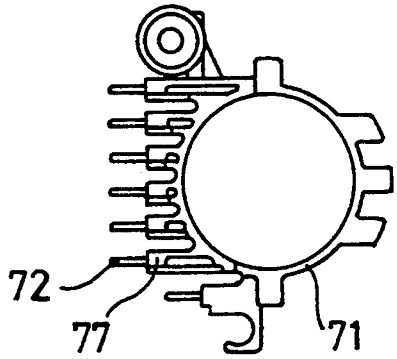
Figure 1C:
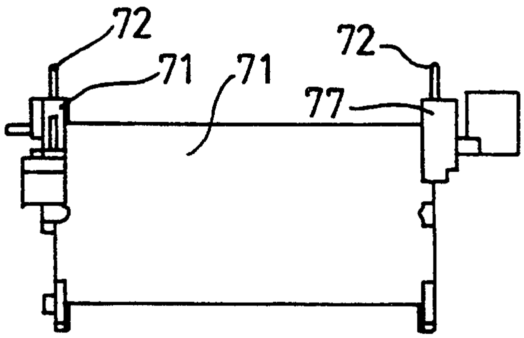
Figure 2A:
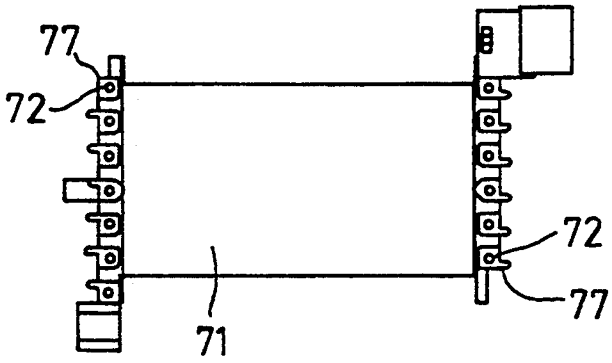
FIGS. 2 (*a*), (*b*) and (*c*) are a plan view, side elevation and front view, respectively, showing a high-tension coil as provided on the coil bobbin.
Figure 2B:
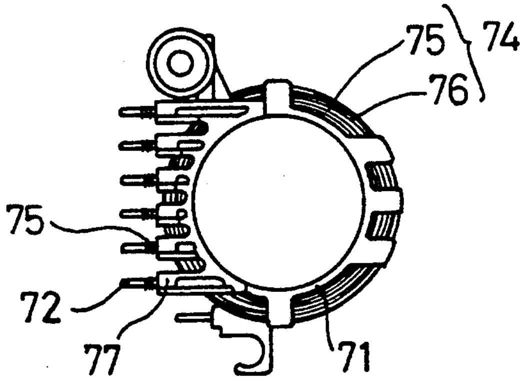
Figure 2C:
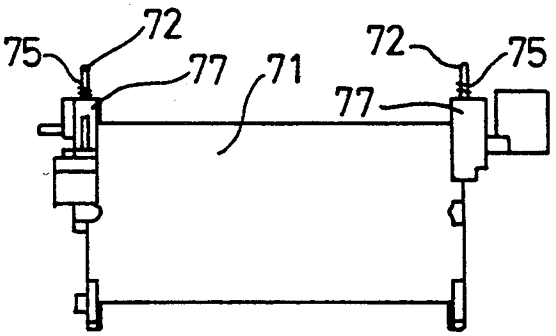

FIGS. 1 (*a*), (*b*) and (*c*) show the appearance of a coil bobbin 71 for use in a flyback transformer device of the invention, and FIGS. 2 (*a*), (*b*) and (*c*) show a high-tension coil 74 as provided around the coil bobbin 71 of FIG. 1. As illustrated, the coil 74 comprises a coil conductor 75 as wound in layers with an insulating film 76 interposed between the layers. With the present embodiment, the high-tension coil is formed in six layers. Opposite ends of conductor portion of each layer are preliminarily fixed as twined around terminal pieces 72.

Figure 3A:
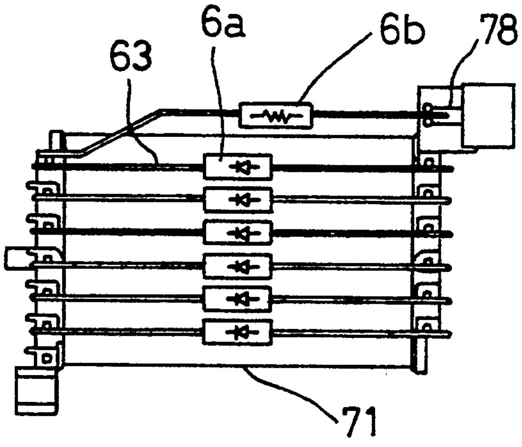
FIGS. 3 (*a*), (*b*) and (*c*) are a plan view, side elevation and front view, respectively, showing a plurality of electronic components as welded to the coil bottin.
Figure 3B:
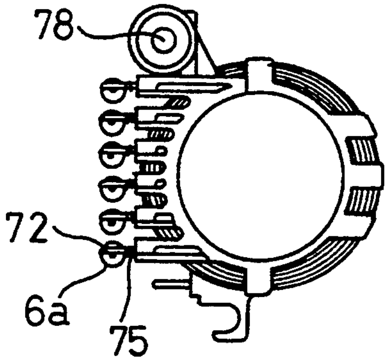
Figure 3C:
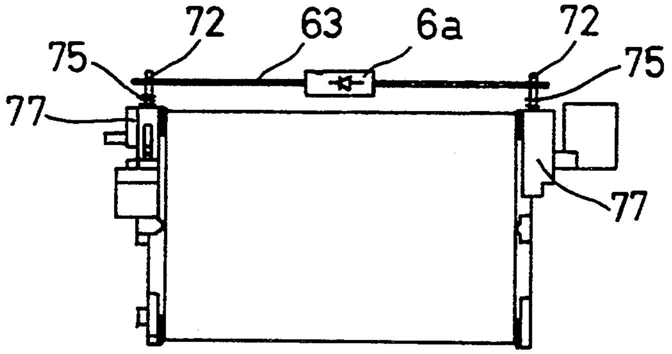

FIGS. 3 (*a*), (*b*) and (*c*) show six diodes **6*a* and one limiting resistor 6*b* as mounted on the coil bobbin 71 having the high-tension coil formed therearound. With reference to these drawings, each diode 6*a* extends between and is electrically welded to a pair of terminal pieces 72, 72 corresponding thereto, while the limiting resistor 6*b* has a lead electrically welded to another terminal piece 72 and a lead soldered to an eyelet terminal 78**.

Process for Preparing Flyback Transformer Device

With reference first to FIGS. 1 (*a*) to (*c*), metal terminal pieces 72 are implanted upright on posts 77 of a coil bobbin 71. Used as the terminal piece 72 in the present embodiment is a brass core wire which is plated with tin.

With reference to FIGS. 2 (*a*) to (*c*), a coil conductor 75 is next wound in six layers around the bobbin 71 with an insulating film 76 interposed between the layers. At this time, opposite ends of the conductor portion 75 of each layer are preliminarily fixed as twined around terminal pieces 72. The number of layers in the high-tension coil differs depending on the type of coil.

Figure 4:
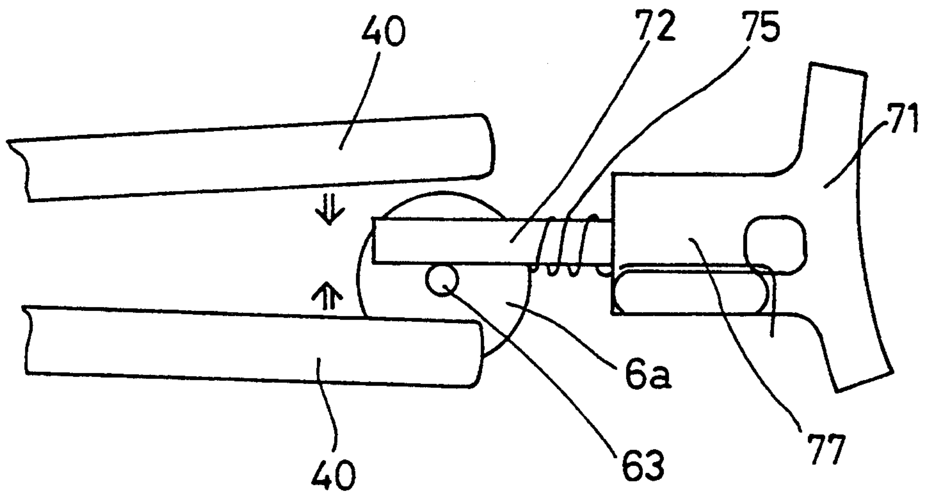
FIG. 4 is a diagram showing a spot welding step.

As shown in FIGS. 3 (*a*), (*b*) and (*c*), diodes **6*a* and a limiting resistor 6*b* are mounted. With reference to FIG. 4, the outer end of lead 63 of each diode 6*a* is held to the terminal piece 72 by being clamped between a pair of welding electrodes 40, 40, and a current of several milliamperes is passed between the electrodes to melt the surfaces of the terminal piece 72 and lead 63 and join them together by spot welding. The terminal piece 72 and the lead 63 of the diode 6*a* thus joined together by spot welding have a sufficient joint strength and are also electrically connected together. As already stated, one lead end of the limiting resistor 6*b*** is spot-welded to the terminal piece 72 in the same manner as above, while the other lead end is preliminarily fixed to an eyelet terminal 78 as engaged therewith.

Figure 5:
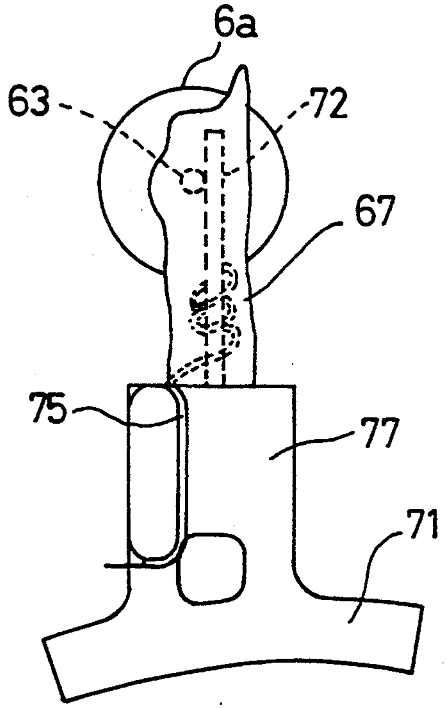
FIG. 5 is an enlarged side elevation showing a terminal portion as soldered by dipping.

After the diodes 6*a* and the limiting resistor 6*b* have been mounted in place in this way, the spot welds between the terminal pieces 72 and the leads 63 of the diodes 6*a*, the coil conductor portions 75 twined around other terminal pieces 72 and the connection between the lead of the resistor 6*b* and the eyelet terminal 78 are dipped in a solder bath (not shown) at the same time for soldering, whereby the welded portions of the terminal pieces 72 and leads 63 and the conductor twined portions are covered with solder 67 as shown in FIG. 5. Although the coil conductor 75 is covered with an insulating coating, the coating is removed by the heat of solder when dipped in the solder bath, so that the conductor 75 and the terminal piece 72 are electrically connected together. The spot weld between the terminal piece 72 and the lead 63 of each diode 6*a* is further reinforced with the solder. The lead of the resistor 6*b* is connected to the eyelet terminal 78 electrically more reliably also by the solder.

Although the terminal piece 72 used in the present invention has a rectangular cross section, this is not limitative, but the section can be circular, or elliptical or otherwise shaped as desired.

In the case of the flyback transformer device described, the lead of the diode 6*a* can be fixedly connected to the terminal piece 72 easily by spot welding. This facilitates automation of the connecting procedure, further leading to the advantage of obviating the need, for example, to bend the diode lead to an L-form. Further with such a type of devices that coil bobbins of different sizes are used, the diode mounting step can be easily executed using a jig for cutting the leads of diodes to a suitable length immediately before mounting, so that the diodes need not be worked on in advance.

Furthermore, the coil conductor twining step preliminarily fixes the end of the conductor 75 to the terminal piece 72, the step of joining the lead 63 of the diode 6*a* to the terminal piece 72 by spot welding secures the diode 6*a* to the terminal piece 72, and the solder dipping step mechanically and electrically connects the coil conductor 75 to the terminal piece 72 simultaneously with establishment of a mechanical and electrical connection between the lead 63 of the diode 6*a* and the terminal piece 72. These steps are therefore advantageous in effecting a sequence of operations automatically.

Construction of Apparatus for Preparing Flyback Transformer Device

Figure 22:
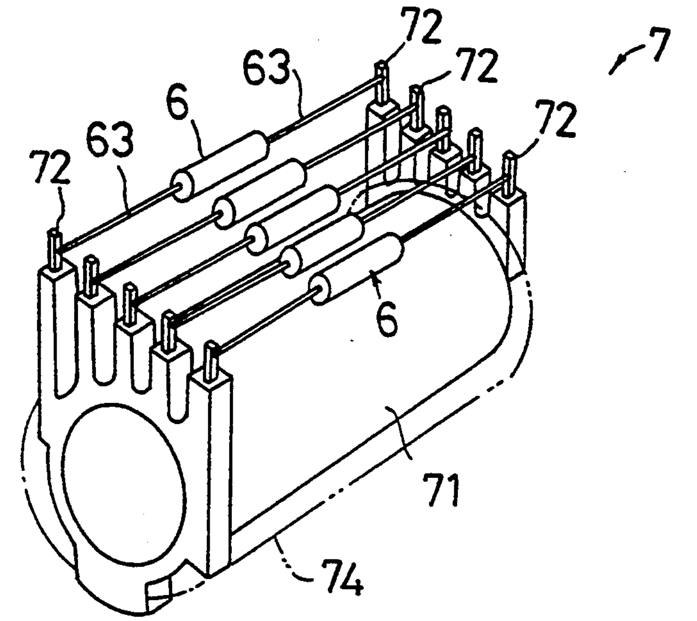
FIG. 22 is a perspective view showing the flyback transformer device to be prepared by the production apparatus of the invention.
Figure 23:
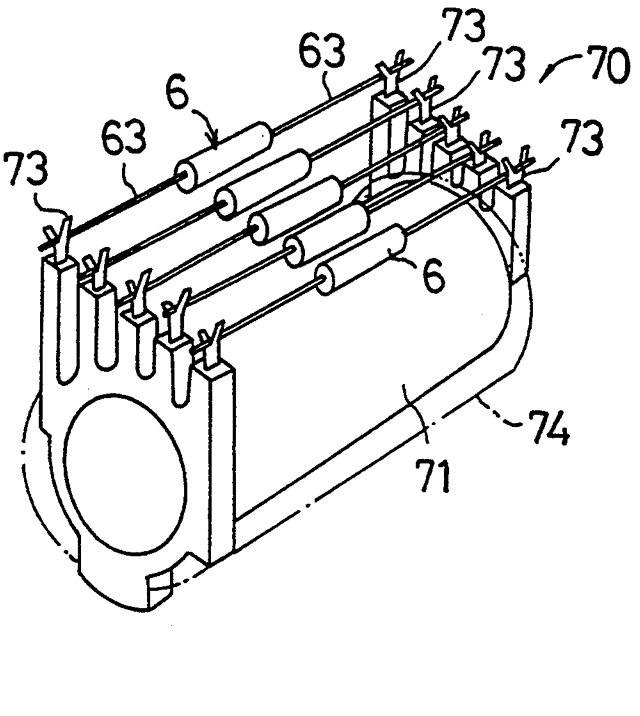
FIG. 23 PRIOR ART
FIG. 23 is a perspective view showing a conventional flyback transformer device.
Figure 24:
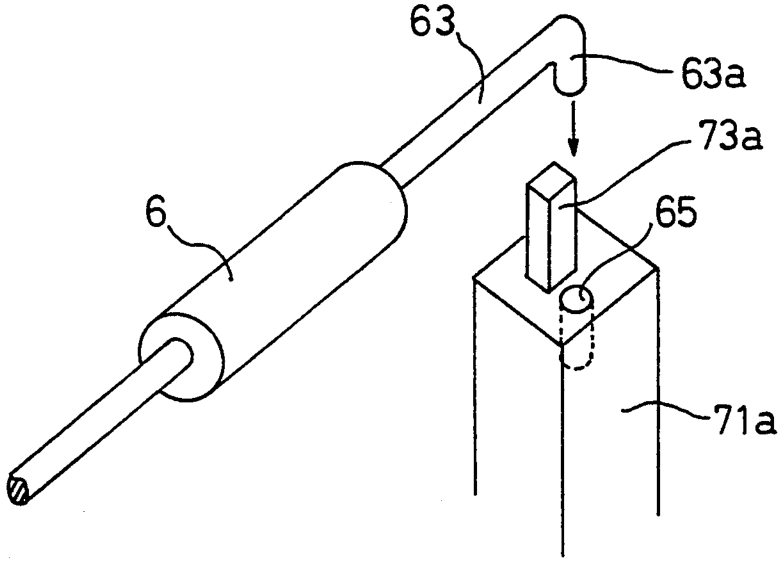
FIG. 24 PRIOR ART
FIG. 24 is a view a lead preliminarily fixing step in a conventional method of producing the flyback transformer device.
Figure 25:
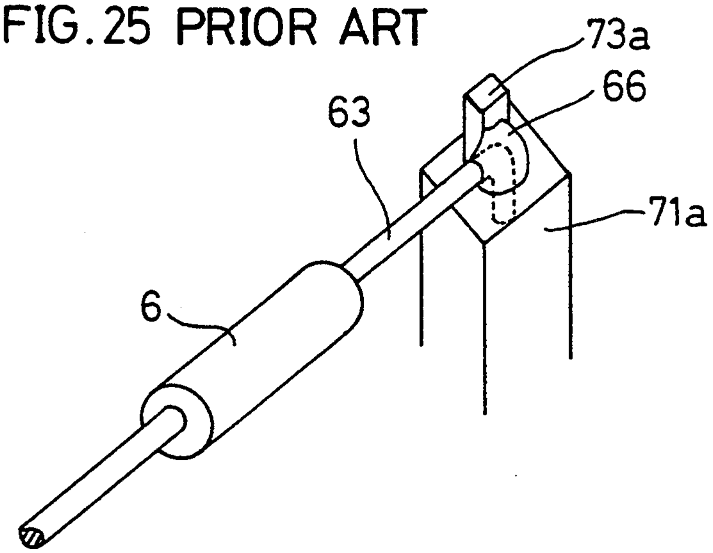
FIG. 25 PRIOR ART
FIG. 25 is a view showing a soldering step of the method.

Next, a production apparatus for actually preparing the flyback transformer device of the above construction will be described in detail with reference to the drawings concerned. As shown in FIG. 22, the flyback transformer device 7 having superposed layers and to be prepared by the apparatus includes a coil bobbin 71 for forming a high-tension coil 74 thereon. A plurality of barlike terminal pieces 72 are provided at each end of the bobbin. An electronic component 6, which is a diode, is provided between the pair of terminal pieces 72, 72. The component 6 has leads 63, 63 which are fixedly connected to the respective terminal pieces 72 by electric welding.

Overall Construction

Figure 6:
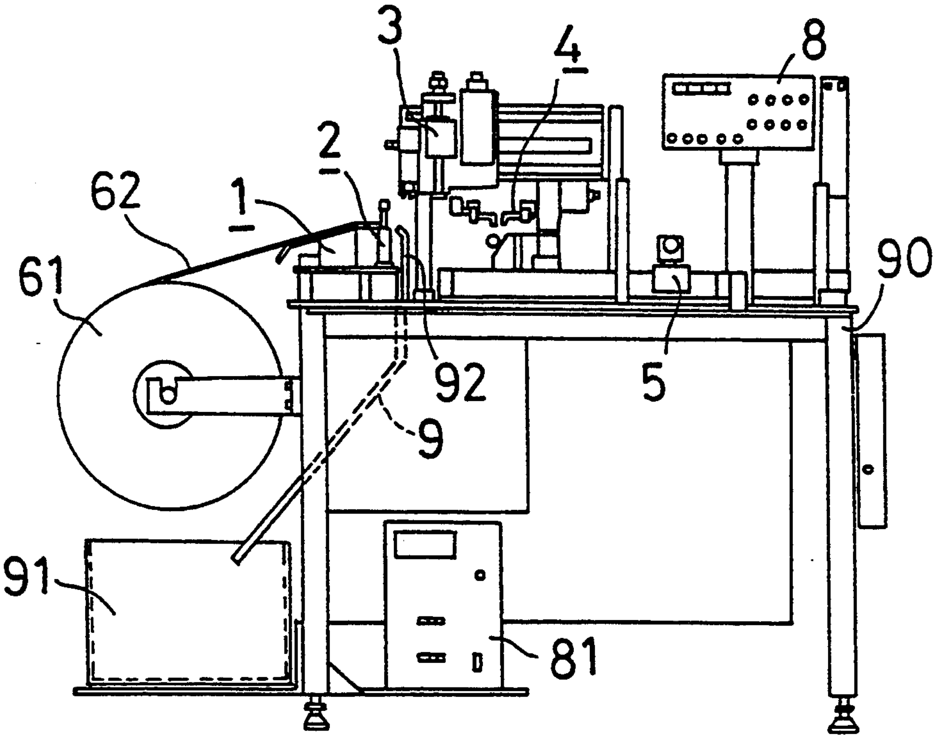
FIG. 6 is an overall front view showing an apparatus embodying the invention for preparing flyback transformer devices.
Figure 7:
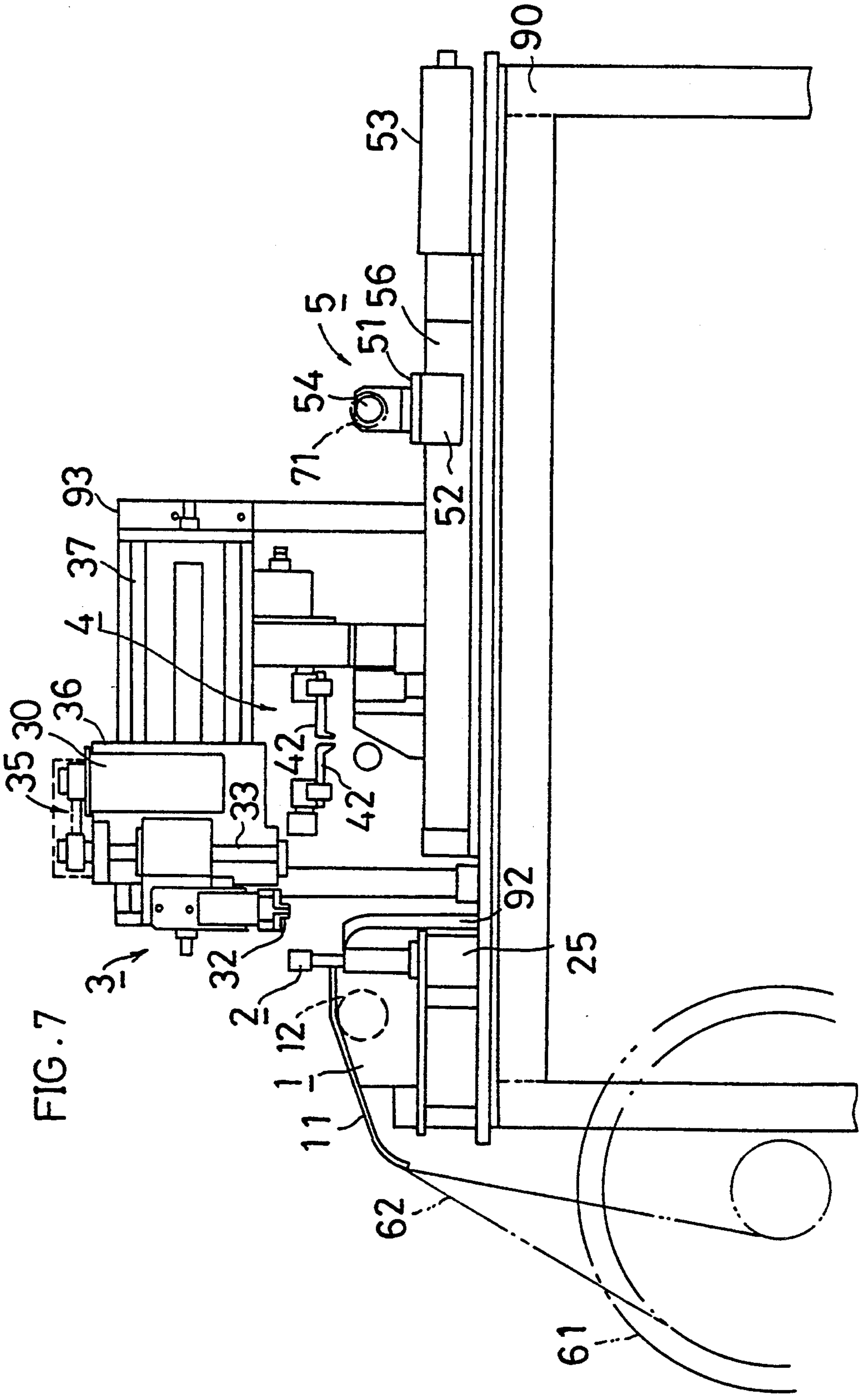
FIG. 7 is an enlarged fragmentary front view of the same.
Figure 8:
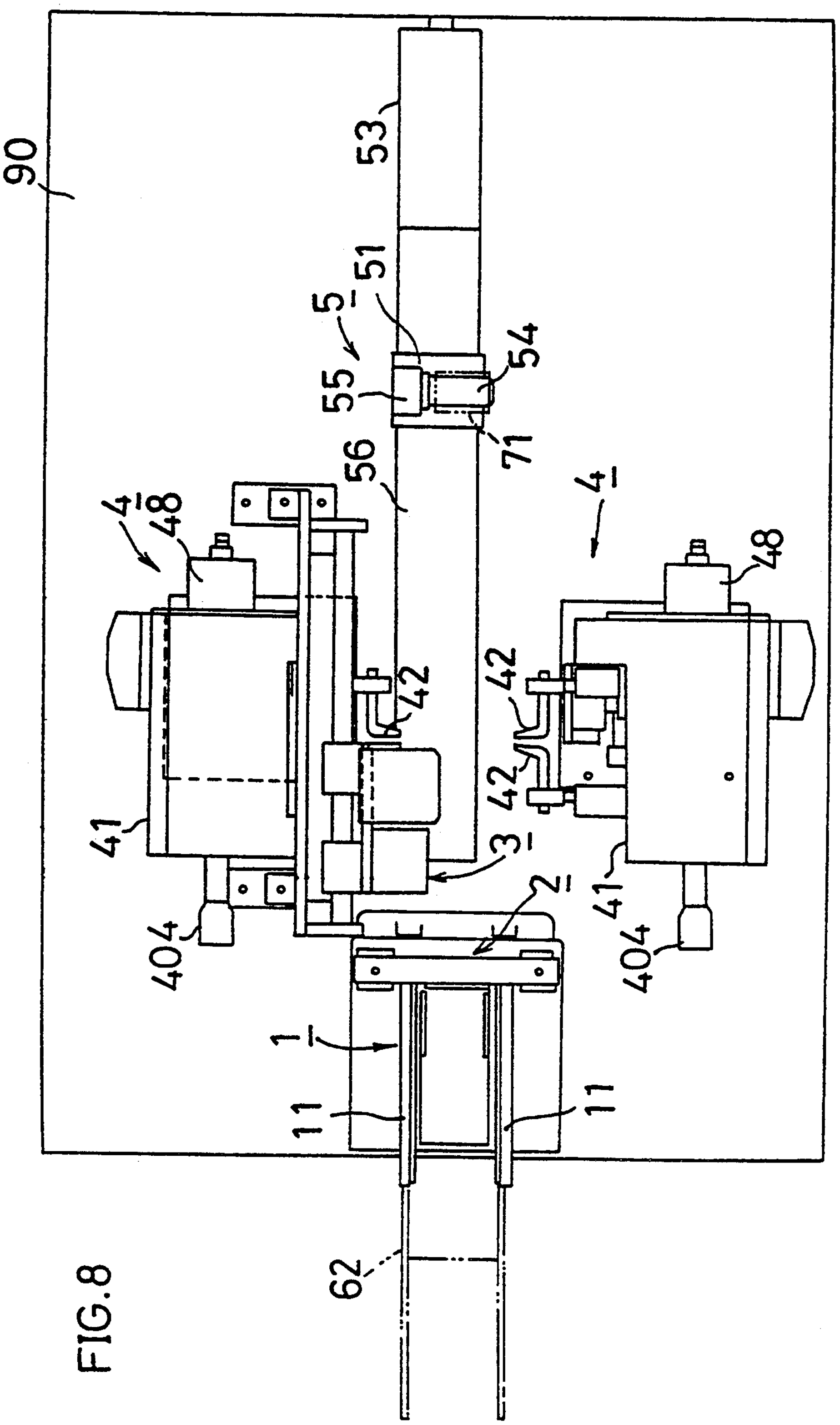
FIG. 8 is a plan view of the same.

With reference to FIGS. 6 to 8, arranged on a frame 90 are an electronic component feeder 1, lead cutter 2, electronic component transfer mechanism 3, electric welder 4 and bobbin feed position determining mechanism 5. Each of these devices operates under the control of a control unit 8 having a microcomputer. A welding power source device 81 is connected to the welder 4. Incidentally, two electric welders 4 which are identical inconstruction are provided at opposite sides of the bobbin feed position determining mechanism 5.

Figure 10:
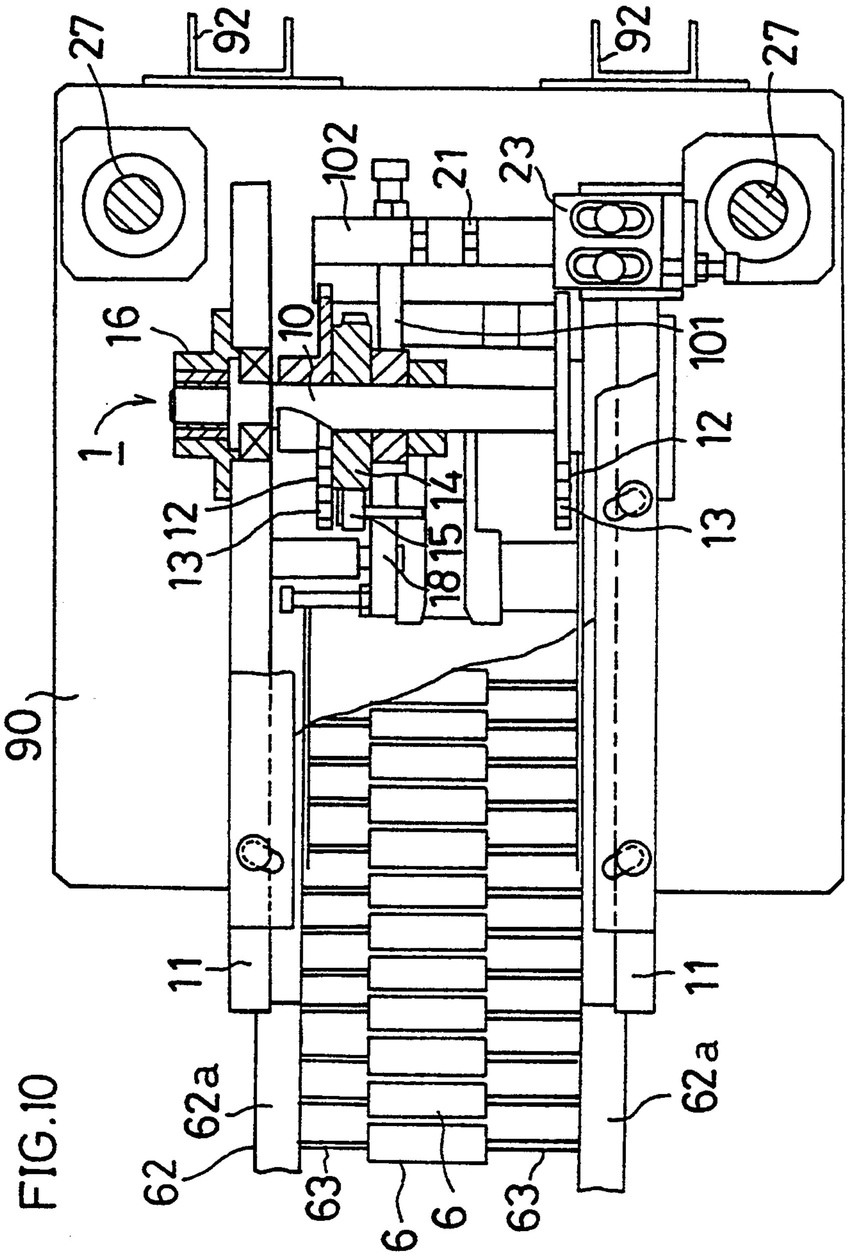
FIG. 10 is a plan view of the same.

A component feed reel 61 for paying off a component supply tape 62 is attached to the left side of the frame 90. The tape separated from electronic components is guided by a tape discharge guide 92 and a tape discharge chute 9 and collected in a tape container baox 91. As shown in FIG. 10, the supply tape 62 includes a multiplicity of electronic components 6 arranged at a specified pitch and having leads 63, 63 the outer ends of which are fixedly affixed to two tape segments 62*a*, 62*a* extending in parallel The electronic component feeder 1 operates to pay off the component supply tape 62 from the reel 61 at the pitch of components in the longitudinal direction and send the components 6 one after another to a position where the leads are cut by the lead cutter 2, intermittently by a distance at a time which distance corresponds to the pitch of components arranged. The lead cutter 2 removes the electronic component 6 set in the cutting position from the supply tape 62 by cutting opposite ends of the leads 63, 63. The bobbin feed position determining mechanism 5 holds a coil bobbin 71 on the frame 90 shown in FIG. 7 at a right end portion thereof, transports the bobbin 71 leftward to a position opposed to the electric welders 4 and thereafter repeats an intermittent feed operation to bring opposed pairs of terminal pieces 72, 72 one after another to a predetermined position for welding by the electric welders 4.

The electronic component transfer mechanism 3 holds the electronic component 6 removed from the supply tape 62 by the lead cutter 2 and transfers the component 6 rightward to a position opposed to the welders 4 to position its leads 63, 63 alongside the respective terminal pieces 72, 72 of the bobbin 71 in the welding position. Each of the electric welders 4 comprises a pair of electrode pieces 42, 42 projecting from a welding head 41 which is movable toward and away from the welding position. The terminal piece 72 of the coil bobbin 71 in the welding position and the lead 63 of the component 6 in position are clamped by the electrode pieces 42 from opposite sides.

A detailed description will be given of the construction and operation of the component devices or mechanisms of the apparatus.

Electronic Component Feeder 1

Figure 9:
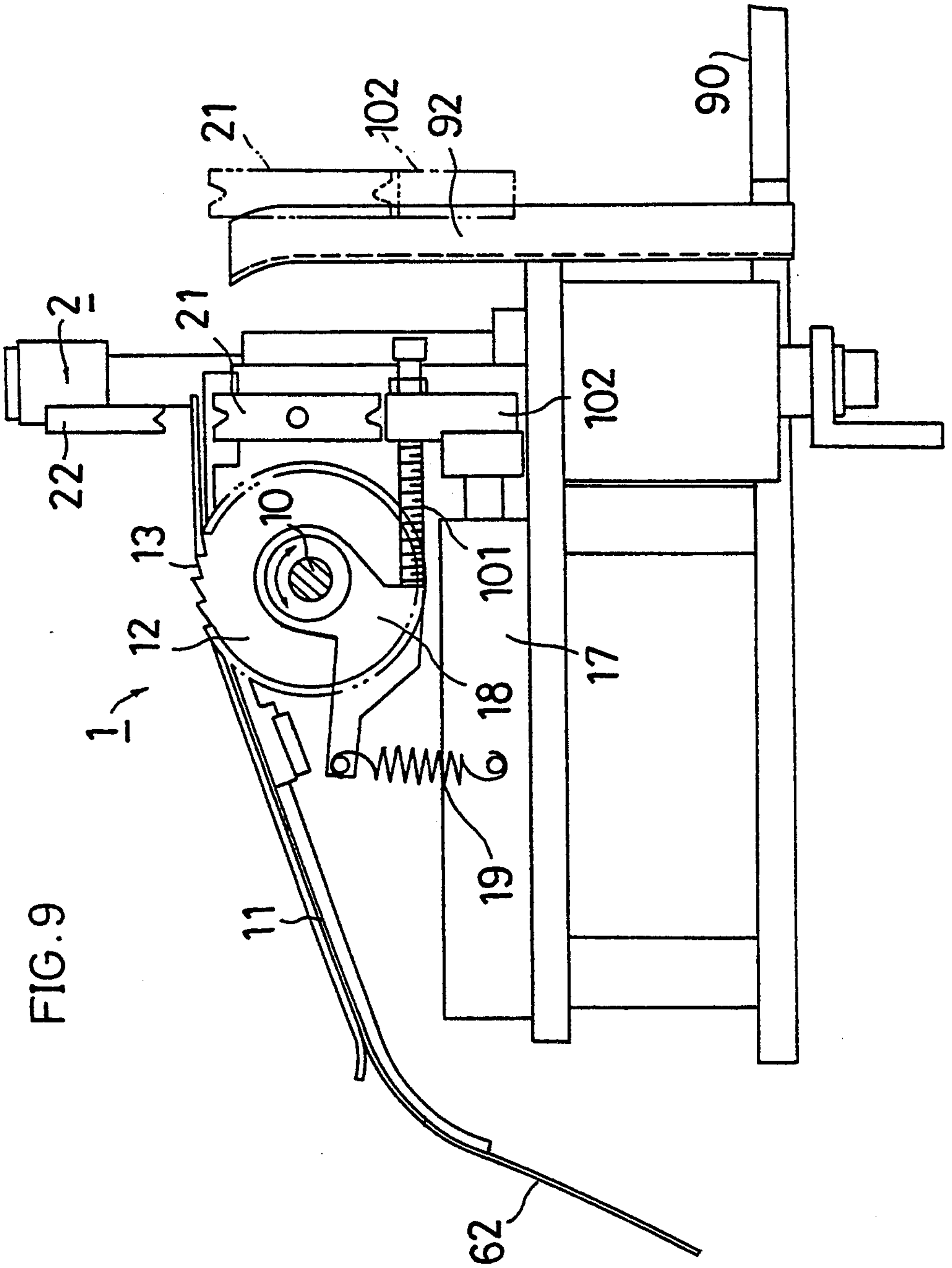
FIG. 9 is a front view showing the construction of an electronic component feeder.

With reference to FIGS. 9 and 10, the component feeder 1 comprises a pair of toothed feed wheels 12, 12 for feeding the electronic components 6 on the supply tape 62 to the lead cutting position intermittently by a distance (pitch) at a time, and tape guides 11, 11 for guiding the movement of the tape 62 toward an inlet side of the feed wheels. Each of the feed wheels 12 is formed along its periphery with feed teeth 13 resembling sawteeth and engageable with the leads 63 of components 6 on the tape 62, the pitch of teeth 13 being equal to the pitch of components 6.

As shown in FIG. 10, a shaft 10 carrying the component feed wheels 12 has mounted thereon a ratchet wheel 14 integral with one of the feed wheels 12. A pawl 15 is in engagement with the tooth of the wheel 14 to provide a ratchet mechanism for rotating the feed wheels 12 toward the component feed direction (clockwise direction) intermittently at a specified pitch. One-way clutch 16 is coupled to the shaft 10 to prevent reverse rotation of the feed wheels 12 and apply a predetermined frictional torque to the wheels 12 when they rotate forward.

As shown in FIG. 9, the shaft 10 has further attached thereto a ratchet drive plate 18 for driving the feed wheels 12 toward the component feed direction. The ratchet drive plate 18 is biased by a tension spring 19 toward a direction opposite to the feed direction (i.e., counterclockwise direction). To drivingly rotate the ratchet drive plate 18 in the feed direction, a reciprocating block 102 is attached to a rod of an actuator 17 and carries a push bolt 101 screwed therethrough and bearing at its forward end against an end portion of the drive plate 18.

Accordingly, when the reciprocating block 102 is advanced rightward by the operation of the actuator 17, the push bolt 101 advances away from the ratchet drive plate 18 at the same time. Consequently, the drive plate 18 rotates counterclock only through a predetermined angle under the action of the tension spring 19. At this time, the feed wheels 12 remain at rest by being prevented by the ratchet mechanism from rotating counterclockwise with the above-mentioned rotation. The operation of the actuator 17 thereafter retracts the reciprocating block 102 leftward, causing the push bolt 101 to drive the ratchet drive plate 18 clockwise, whereby the feed wheels 12 are rotated clockwise, i.e., toward the component feed direction, through a predetermined angle.

As a result, the electronic components on the tape guides 11 are fed to the lead cutting position, one at a time by the intermittent rotation of the feed wheels 12. The angle through which the feed wheels 12 are rotated at a time is adjustable by the the position of the push bolt 101 relative to the reciprocating block 102 which position is determined by screwing the bolt, whereby the amount of the tape 62 to be fed at a time can be made to accurately match the pitch of components.

Lead cutter 2

Figure 11:
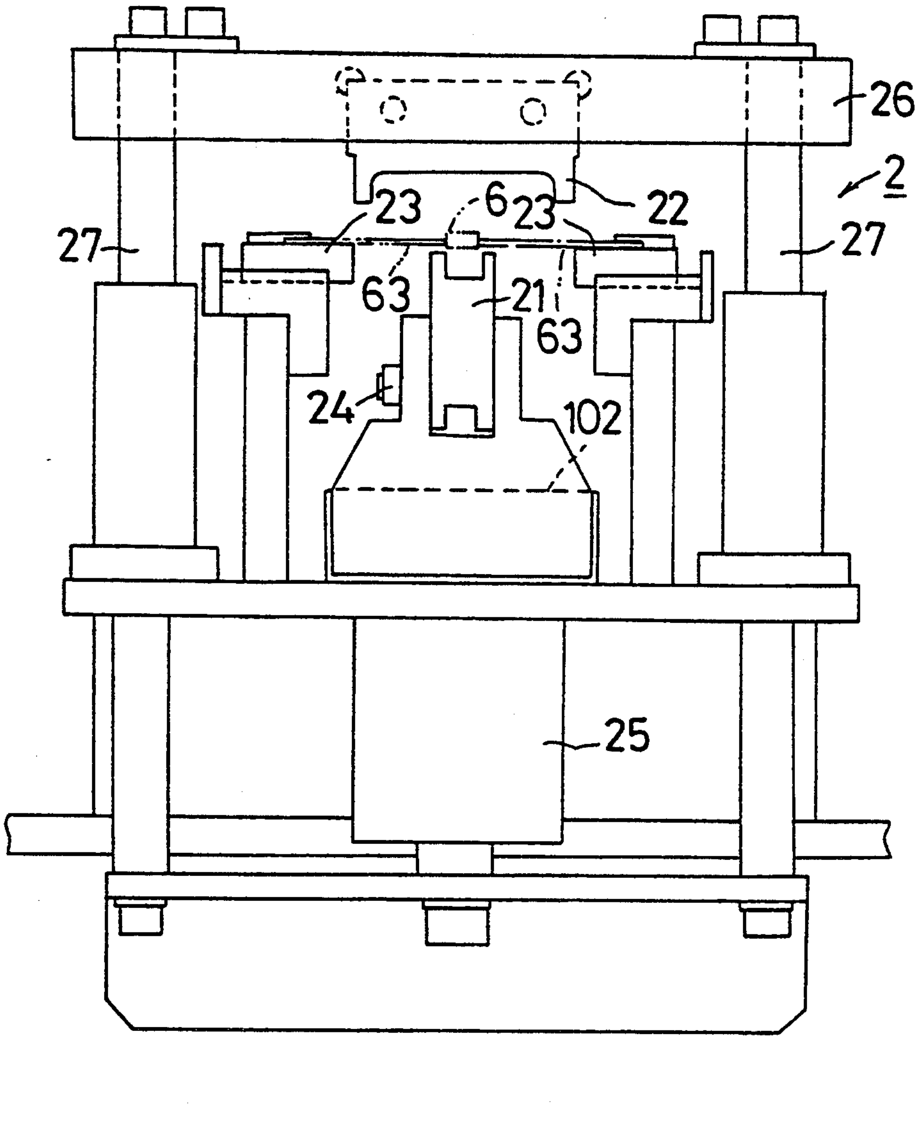
FIG. 11 is a side elevation of a lead cutter.

The lead cutter 2 comprises, as shown in FIG. 11, an upper blade 22 having a cutting edge at each of two cutting positions and two lower blades 23, 23 for cutting the leads 63, 63 of the component 6 at their outer end portions. The upper blade 22 is fixed to a lift block 26, while the lower blades 23, 23 are fixedly positioned at a predetermined level. Connected by shafts 27, 27 to the lift block 26 is an actuator 25 for driving the block 26 downward, whereby the upper blade 22 engages with the lower blades 23 to cut the leads 63 of the electronic component 6.

Disposed below the lead cutting position is a component receiving member 21 for receiving the component 6 separated from the supply tape, at the base ends of the leads 63, 63. The component receiving member 21 is mounted on the reciprocating block 102 constituting the component feeder 1, and is in a standby position immediately below the upper blade 22 when to cut the leads as seen in FIG. 9. A ball plunger 24 is coupled to the component receiving member 21. When tightened up, the ball plunger 24 reliably fixes the receiving member 21 to the reciprocating block 102.

Figure 12:
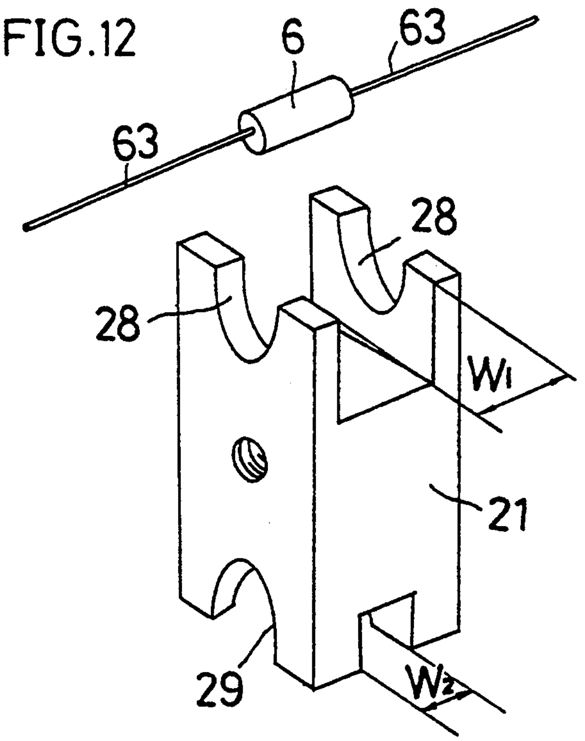
FIG. 12 is a perspective view of a component receiving member.

With reference to FIG. 12, the receiving member 21 has a pair of recesses 28, 28 spaced apart by a predetermined distance $W_1$ for the leads 63, 63 of the component 6 to fit in. The component 6 is accommodated in the space between the recesses 28, 28. The receiving member 21 is formed in one side thereof opposite to the recessed side (28) with a pair of recesses 29, 29 which are spaced apart by a distance $W_2$ different from the distance $W_1$ so as to handle electronic components of different size when mounted as turned upside down on the reciprocating block 102.

To separate off components of different size, the upper blade 22 is removably attached to the lift block 26, while the position of the lower blades 23 is adjustable according to the width of the upper blade 22.

Figure 13:
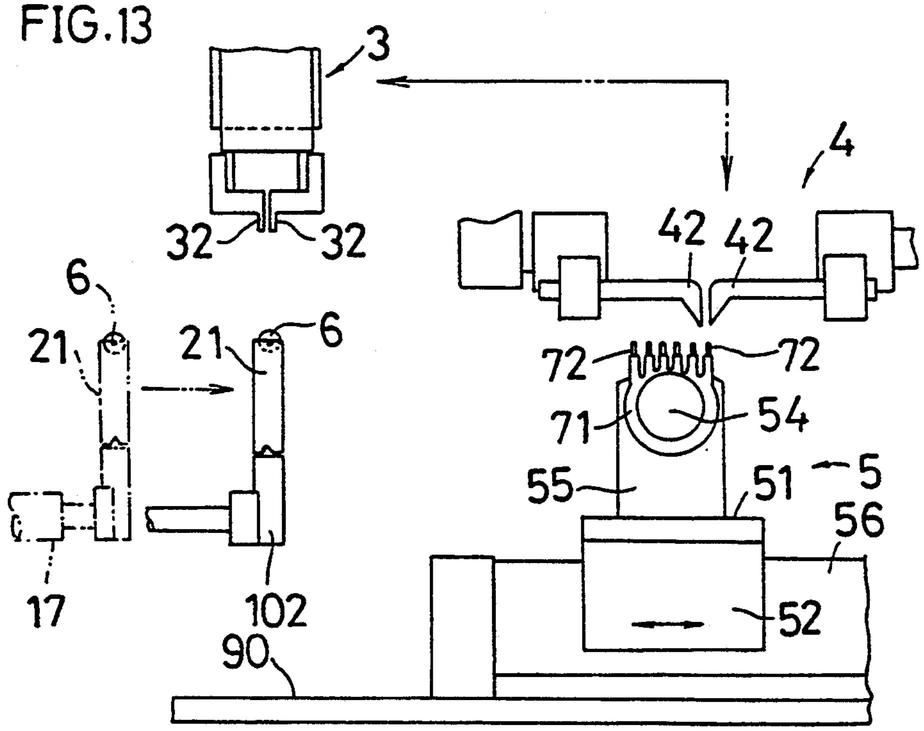
FIG. 13 is a front view for illustrating a path of movement of electronic components.

When the upper blade 22 is lowered from the position shown in FIG. 9 for cutting the lead, the reciprocating block 102 is retracted as stated above to position the component receiving member 21 below the upper blade 22, and the electronic component separated from the supply tape 62 by cutting falls onto the receiving member 21. Subsequently, with the advance of the block 102 to rotate the ratchet drive plate 18 counterclockwise, the receiving member 21 moves with the component placed thereon to the broken-line position of FIG. 9 to deliver the component to the electronic component transfer mechanism 3 as shown in FIG. 13.

Electronic Component Transfer Mechanism 3

Figure 14:
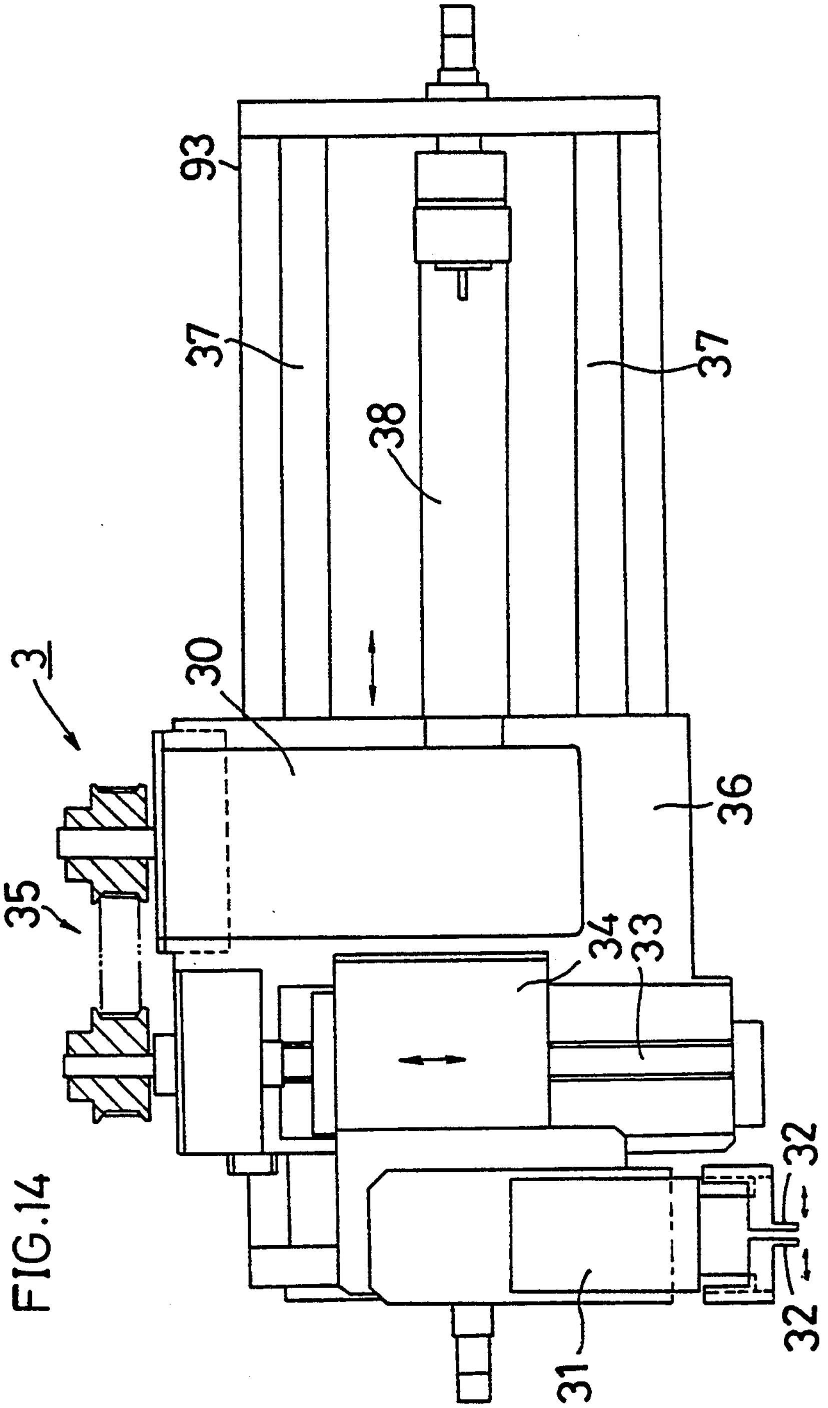
FIG. 14 is a front view of an electronic component transfer mechanism.
Figure 15:
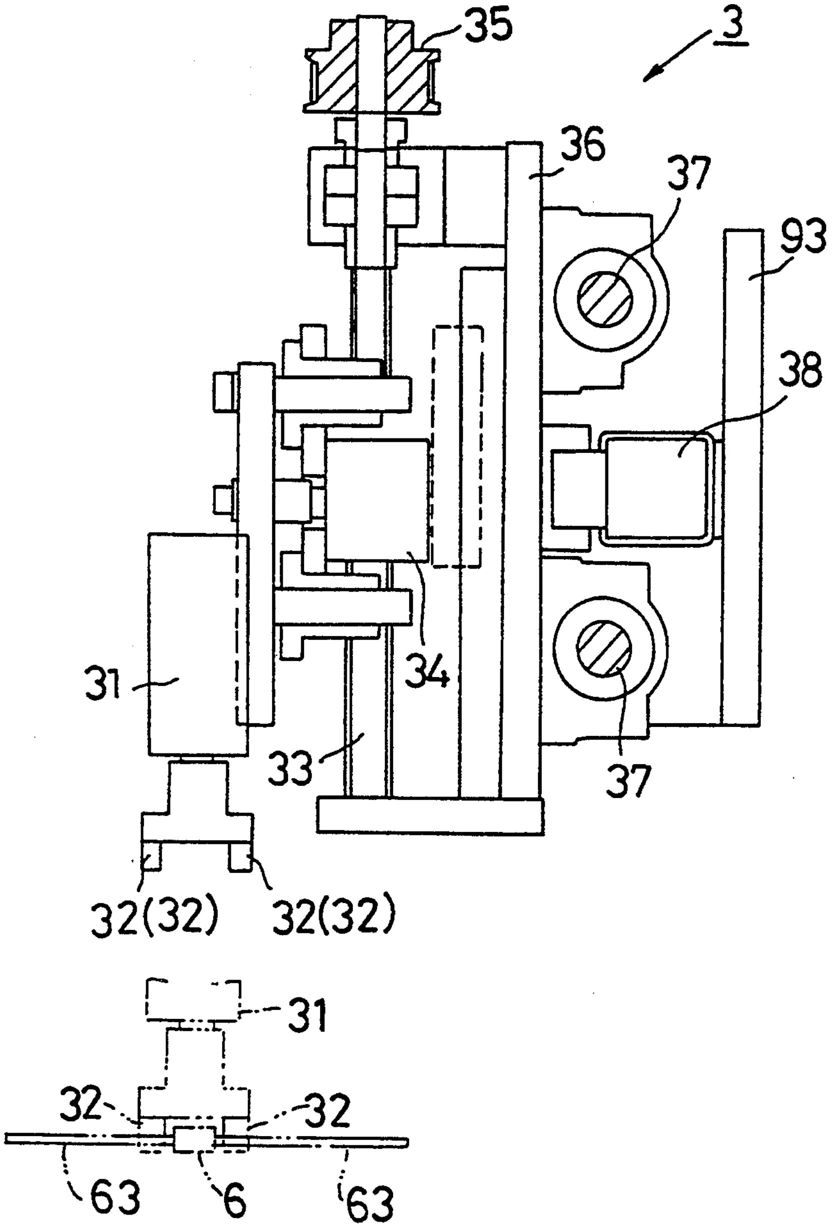
FIG. 15 is a side elevation partly broken away of the same.

With reference to FIGS. 14 and 15, the electronic component transfer mechanism 3 is attached to a mount plate 93 provided upright on the frame 90 and is reciprocatingly movable horizontally. The mechanism 3 has two pairs of chuck members 32, 32 which pairs are spaced apart by a distance in accordance with the length of the electronic component for gripping the respective leads 63.

Two guide shafts 37, 37 extending horizontally in parallel to each other are supported by the mount plate 93. A reciprocating block 36 is slidable on the guide shafts in engagement therewith. An actuator 38 is disposed between the mount plate 93 and the block 36 for reciprocatingly driving the block 36.

The reciprocating block 36 is provided with a vertical ball screw 33, which carries a lift block 34 in screw-thread engagement therewith. The ball screw 33 is coupled to a servomotor 30 by pulley means 35. The ball screw 33 is drivingly rotatable forward or reversely by the servomotor 30, whereby the lift block 34 is moved upward or downward. The two pairs of chuck members 32, 32 are attached to the lift block 34. An actuator 31 is coupled to the chuck members 32 to open or close these members.

With reference to FIG. 13, the advance of the reciprocating block 102 moves the electronic component 6 on the receiving member 21 to below the chuck members 32, 32 of the transfer mechanism 3, whereupon the lift block 34 of the transfer mechanism 3 lowers, causing the chuck members 32, 32 to hold the leads 63, 63 of the component 6 as indicated in broken lines in FIG. 15.

Figure 20:
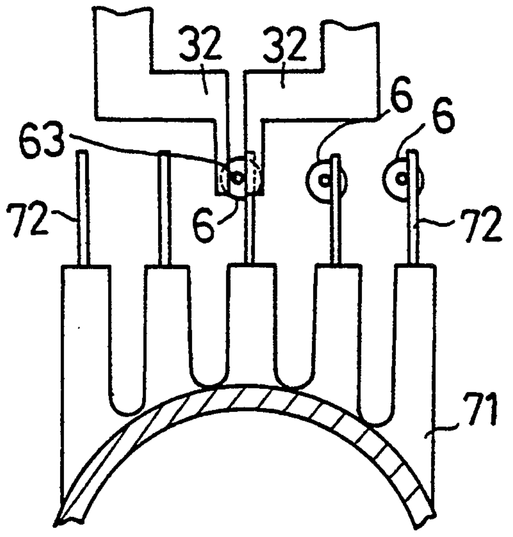
FIG. 20 is an enlarged front view showing a lead of the electronic component as positioned on a terminal piece of the coil bobbin.

Next, the lift block 34 rises to raise the component 6, and the reciprocating block 36 horizontally moves to a position above the welding position of the electric welders 4. The lift block 34 thereafter lowers, whereby the component 6 held by the chuck members 32, 32 is positioned alongside a pair of terminal pieces 72 on the coil bobbin 71 in the welding position as shown in FIG. 20.

With the component transfer mechanism 3 described, the servomotor 30 is used as a drive source for the vertical movement, so that the stop position of the vertical movement can be determined as desired. Furthermore, the use of the ball screw 33 as the drive mechanism assures high positioning precision.

Bobbin Feed Position Determining Mechanism 5

Figure 16:
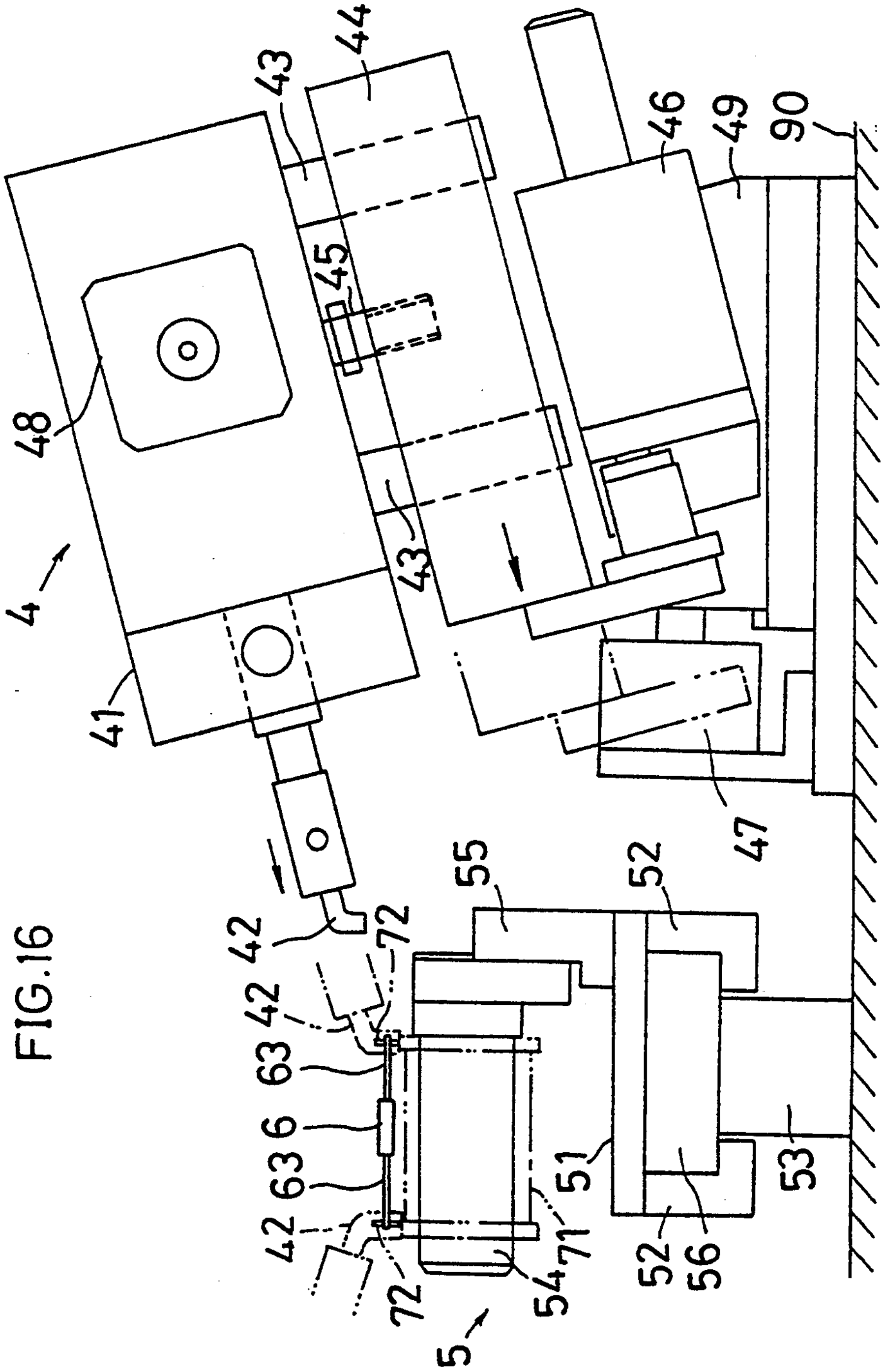
FIG. 16 is a side elevation of an electric welder.

The bobbin feed position determining mechanism 5 comprises, as shown in FIGS. 7, 8 and 16, a rail 56 mounted on the frame 90, a slide base 51 having a pair of arms 52, 52 projecting therefrom for embracing the rail 56 from opposite sides, slide drive means 53 for reciprocatingly moving the slide base 51 along the rail 56, and a bobbin mount shaft 54 supported on the slide base 51 by a support member 55. The bobbin mount shaft 54 is removably attached to the support member 55 so as to be readily replaceable for handling bobbins of different size.

The coil bobbin 71 as fitted to the mount shaft 54 as shown in FIG. 16, is moved from the bottin mounting position shown in FIG. 7 to the welding position shown in FIG. 13 by the operation of the slide drive means 53. The slide drive means is adapted to reciprocatingly drive the slide base 51 by rotating a ball screw forward or reversely by a servomotor so as to position the bobbin 71, as mounted on the shaft 54, in place with high accuracy.

The electronic component 6 held by the chuck members 32, 32 of the transfer mechanism 3 is lowered toward the coil bobbin 71 set in the welding position as shown in FIG. 13 to position the leads 63 of the component 6 alongside the desired pair of terminal pieces 72 on the bobbin 71 as shown in FIG. 20.

The electric welders 4 to be described below perform a welding operation on the coil bottin 71 transported from the bobbin mounting position to the welding position to connect one electronic component 6 to the coil bobbin 71. During the following period before the second component 6 is brought to the welding position by the transfer mechanism 3, the bobbin feed position determining mechanism 5 positions the next pair of terminal pieces 72 to be welded at the welding position by moving the bobbin 71 by a small distance (e.g., 1 mm to 3 mm) equal to the pitch of terminal pieces 72.

After the second component 6 has been welded to the bobbin 71 by the welders 4, the position determining mechanism 5 similarly repeats the above movement until a predetermined number of pairs of components 6 are completely welded.

Electric Welder 4

Figure 17:
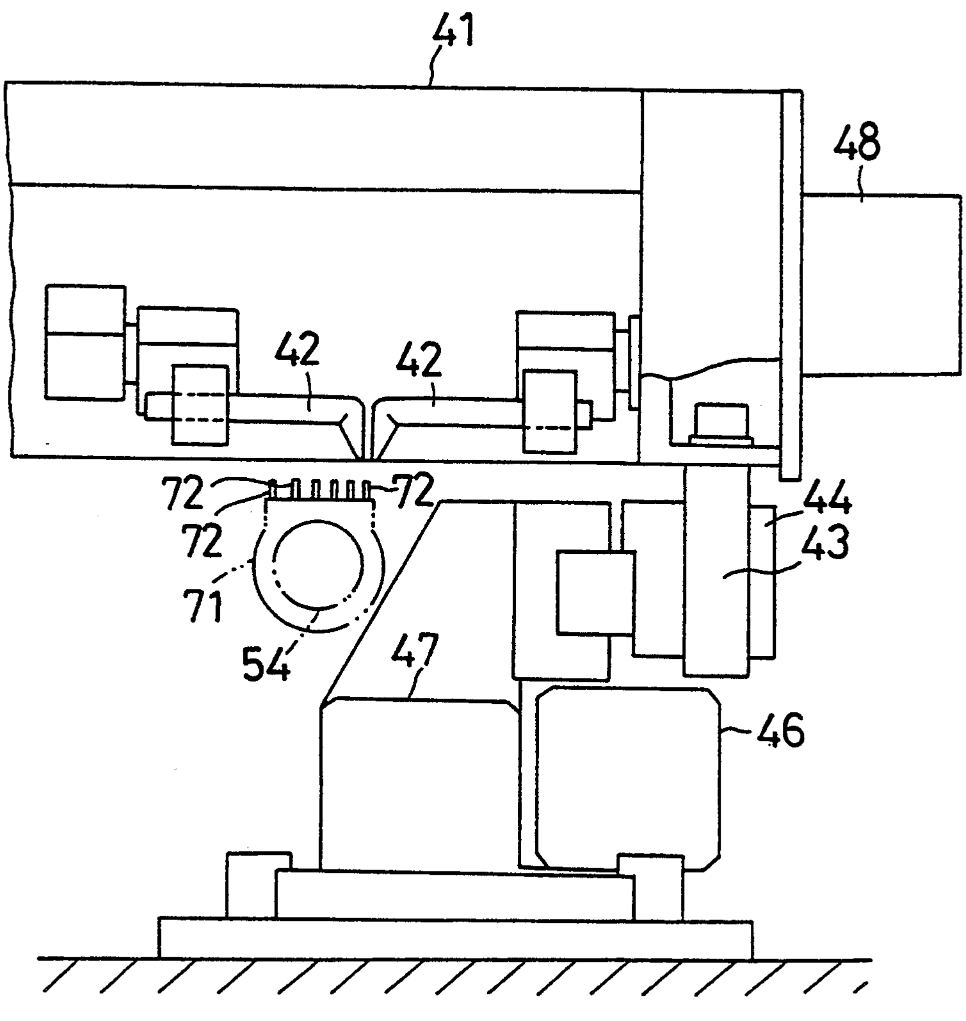
FIG. 17 is a front view of the same.

With reference to FIGS. 16 and 17, each of the electric welders 4 has a slide block 49 mounted on the frame 90 and slidable toward or away from the welding position. The welding head 41 is mounted as inclined at a predetermined angle on the slide block 49 by means of a position adjusting block 44. Two guide shafts 43, 43 project downward from the bottom of the welding head 41 and slidably extend through the position adjusting block 44. A level adjusting screw 45 is provided between the welding head 41 and the position adjusting block 44. The level of the welding head 41 on the block 44 is adjustable by manipulating the screw 45.

The position adjusting block 44 is connected to the outer end of a rod of an actuator 46 mounted on the slide block 49 as inclined at the same angle as the welding head 41. The operation of the actuator 46 reciprocatingly moves the position adjusting block 44 and the welding head 41 as inclined. The welding head 41 has projected therefrom the above-mentioned pair of electrode pieces 42, 42. The welding head 41 is moved toward the coil bobbin 71 in the welding position by the operation of the actuator 46, with the result that the pair of electrode pieces 42, 42 are positioned at opposite sides of the lead 63 and the terminal piece 72 in the welding position to hold them.

Coupled to the slide block 49 is a position adjusting actuator 47 for horizontally moving the slide block 49 when coil bobbins 71 of different shape are to be handled. For such bobbins, the level adjusting screw 45 is also turned to alter the level of the welding head 41.

The electrode pieces 42, 42 are made of a material which is suitably determined in view of electric conductivity, hardness, etc. in accordance with the material of the leads and terminal pieces to be welded. According to the present embodiment, a special alloy is used which is prepared by adding chrominum, zirconium, etc. to copper.

Figure 18:
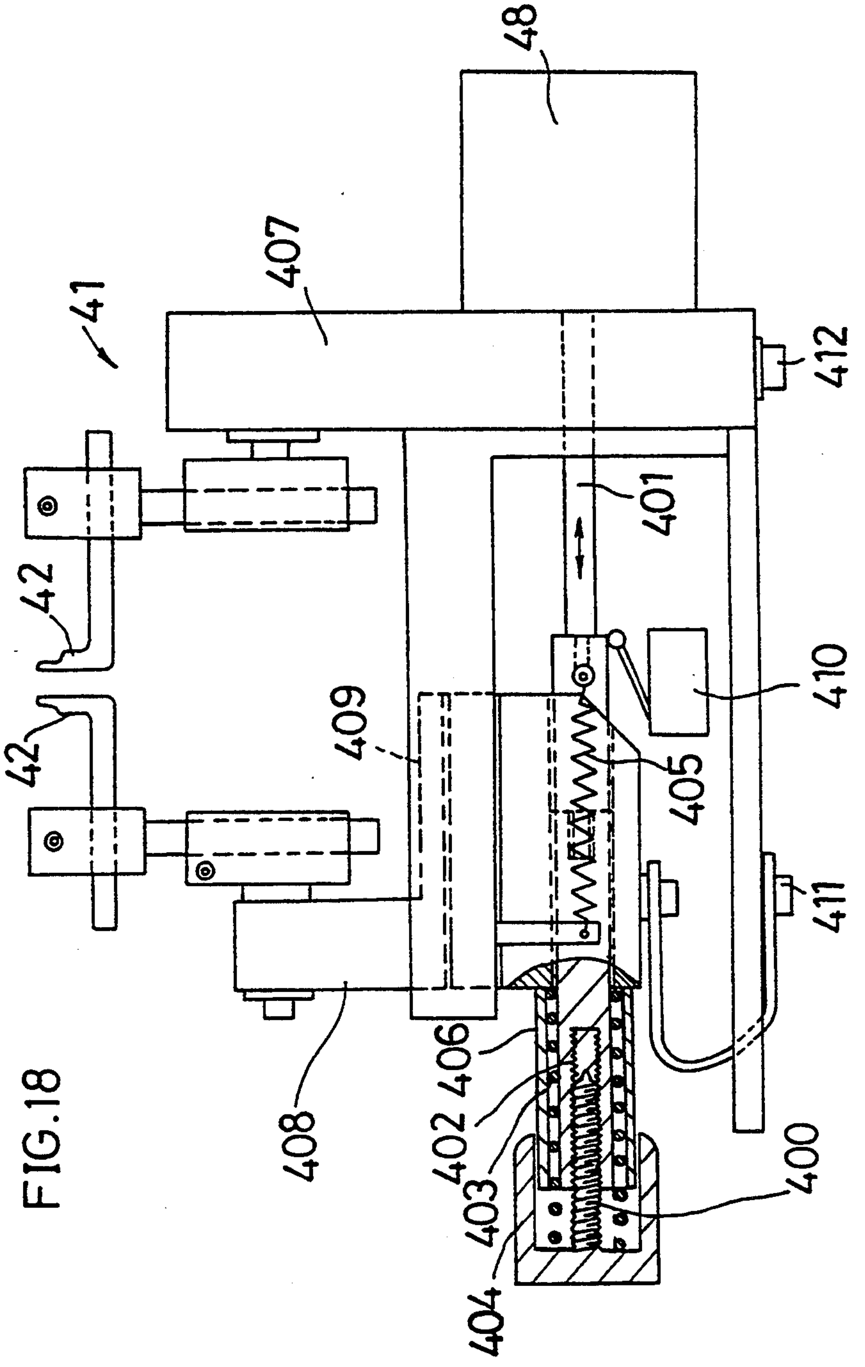
FIG. 18 is a plan view showing the internal construction of a welding head.
Figure 19:
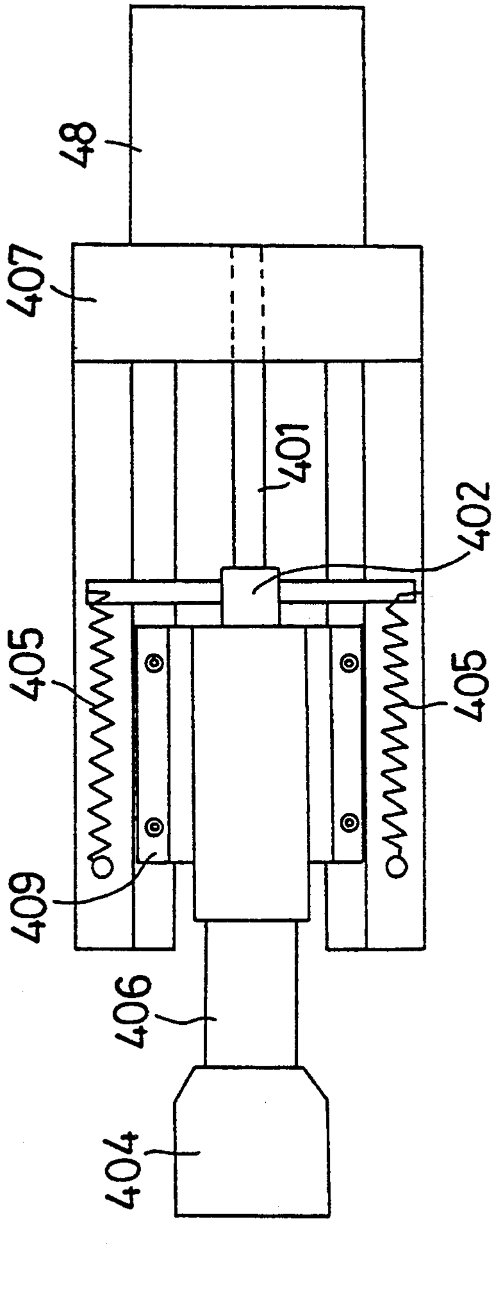
FIG. 19 is a front view of the same.

FIGS. 18 and 19 show the interior construction of the welding head 41. A slide body 409 is in engagement with a first arm 407 mounted on the frame 90 and slidable horizontally relative to the arm. The slide body has a second arm 408 projecting therefrom. The two electrode pieces 42, 42 are attached to the respective arms.

Fixed to the first arm 407 is an actuator which has a rod connected by a connecting rod 401 to a pressure shaft 402 at its base end, the shaft 2 extending through the slide body 409. The pressure shaft 402 has a forward and on which an adjusting screw 400 is screwed. A knob 404 is integral with the head of the screw 400. A tube 406 projects from a side portion of the slide body 409. A coiled compression spring 403 is provided between the pressure shaft 402 and the tube 406 for biasing the slide body 409 rightward relative to the pressure shaft 402. Tension springs 405 provided between the first arm 407 and the pressure shfat 402 bias this shaft 402 leftward.

The first arm 407 is provided with terminals 411, 412 for passing current between the pair of electrode pieces 42, 42. These terminals are connected to the aforementioned welding power supply device 81. A limit switch 410 is provided along the path of movement of the connecting rod 401. The limit switch 410 is turned on when the pressure shaft 402 is moved rightward by being pulled by the actuator 48, and current is passed between the pair of electrode pieces 42, 42 in response to the resulting ON signal.

With the pair of electrode pieces 42, 42 arranged at opposite sides of the lead and the terminal piece, the pressure shaft 402 is driven rightward by the actuator 48 against the tension springs 405, whereupon the slide body 409 is driven rightward through the compression spring 403, with the result that the left electrode piece 42 projecting from the slide body 409 is brought toward the right electrode piece 42 to clamp the lead and the terminal piece between the two electrode pieces 42, 42.

The actuator 48 is further driven also after the slide body 409 has come to a halt to compress the spring 403. The slide body 409 is pressed rightward by the repellent force of the spring 403. This pressure acts to press the left electrode piece 42 projecting from the slide body 409 against the right electrode piece 42.

Figure 21:
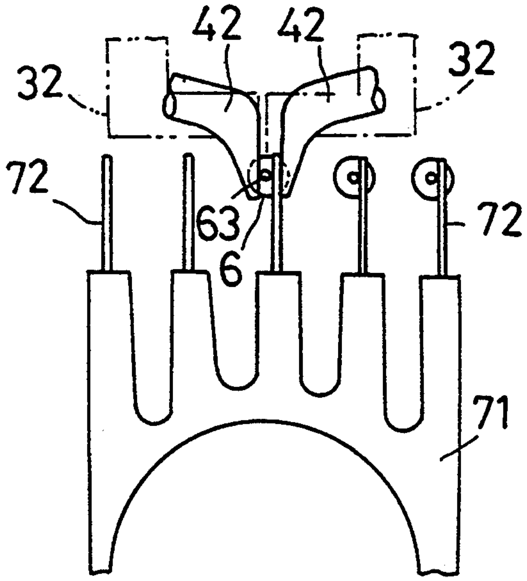
FIG. 21 is an enlarged front view showing the lead and the terminal piece as held between electrode pieces of the welder.

As a result, the lead 63 of the electronic component 6 and the terminal piece 72 of the bobbin 71 in the welding position are held between the pair of electrode pieces 42, 42 under pressure as shown in FIG. 21. Immediately thereafter, the limit switch 410 operates to pass current between the electrode pieces 42, 42. This produces Joule heat due to contact resistance at the portions where the electrode pieces are in contact with the lead 63 and with the piece 72. The Joule heat joins the lead 63 to the terminal piece 72 by spot welding.

With the electric welder 4, the knob 404 is turned to adjust the initial amount of compression of the spring 403, whereby the clamping pressure to be exerted by the pair of electrode pieces 42, 42 on the lead and terminal piece can be set at a suitable value.

When a capacitor type welding power source is used as the power source device 81, satisfactory results can be obtained by setting the current passing capacity at 2 to 3 kA and current passing time at 1 to 3 msec. More satisfactory results can be expected if a welding power source of the inverter type is used.

According to the present embodiment, two electric welders 4, 4 are arranged at opposite sides of the welding position as shown in FIG. 8 to weld the respective leads 63, 63 of the electronic component 6. The two welders need to be energized with a slight time lag therebetween to prevent the electronic component from breaking. With the present invention, therefore, a distributor is used to connect a common power supply to the welders 4, 4 alternatively.

With the apparatus described for preparing flyback transformer devices, electronic components can be connected to coil bobbins with a reduced number of steps. This serves to greatly reduce the production cost of flyback transformer devices. Use of electric welding to make fixed connections eliminates the need for a complex transformer structure for preliminarily fixing the electronic component lead to the terminal piece to realize coil bobbins of reduced size.

The above description of embodiments is given for the illustration of the present invention and should not be interpreted as limiting the invention defined in the appended claims or reducing the scope thereof. The construction of the components of the present device and apparatus is not limited to those of the embodiments but can of course be modified variously by one skilled in the art without departing from the spirit of the invention as defined in the claims.

For example, with the foregoing electric welder 4, one of the electrodes 42 is fixed to the welding head 41, with the other electrode piece 42 made movable to clamp the lead and the terminal piece, whereas the two electrode pieces 42, 42 can be driven at the same time for opening or closing.

What is claimed is:

1. An apparatus for preparing a flyback transformer device by fixedly connecting leads of an electronic component to terminal pieces provided upright on a coil bobbin, characterized in that the apparatus comprises:

an electronic component feeder for feeding a component supply tape having a plurality of electronic components arranged at a specified pitch by paying off the tape longitudinally thereof by the specified pitch to send the components one after another to a lead cutting position, a lead cutter for cutting off the electronic component in the lead cutting position at outer ends of leads to separate the component from the supply tape, a bobbin feed position determining mechanism for feeding the coil bobbin toward a predetermined welding position to position a terminal piece of the coil bobbin in the welding position, an electronic component transfer mechanism for transferring the electronic component as cut off from the supply tape by the cutter toward the welding position and positioning the lead of the component alongside the terminal piece of the bobbin in the welding position, and an electric welder comprising a welding head movable toward or away from the welding position, and a pair of electrode pieces projecting from the welding head for holding therebetween the terminal piece of the coil bobbin and the lead of the component in the welding position to electrically weld the lead of the component to the terminal piece of the bobbin by passing current between the pair of electrode pieces.

* * * * *